United States Patent
Goupil et al.

(10) Patent No.: US 8,818,573 B2
(45) Date of Patent: Aug. 26, 2014

(54) METHOD AND DEVICE FOR DETECTING AN UNCONTROLLED MOVEMENT OF AN AIRCRAFT CONTROL SURFACE

(75) Inventors: Philippe Goupil, Beaupuy (FR); Rémy Dayre, Pibrac (FR); Hervé Le Berre, Leguevin (FR); Anca Gheorghe, Bordeaux (FR); Ali Zolghadri, Leognan (FR); Jérôme Cieslak, Talence (FR)

(73) Assignees: Airbus Operations (SAS), Toulouse (FR); Universite Bordeaux I, Talence (FR); Centre National de la Recherche Scientifique, Paris (FR)

( * ) Notice: Subject to any disclaimer, the term of this patent is extended or adjusted under 35 U.S.C. 154(b) by 217 days.

(21) Appl. No.: 13/552,104

(22) Filed: Jul. 18, 2012

(65) Prior Publication Data
US 2013/0026287 A1    Jan. 31, 2013

(30) Foreign Application Priority Data
Jul. 28, 2011    (FR) ...................... 11 56900

(51) Int. Cl.
*G01C 23/00*    (2006.01)
*B64C 13/50*    (2006.01)
*B64D 45/00*    (2006.01)

(52) U.S. Cl.
CPC ................ *B64D 45/0005* (2013.01); *B64C 13/50* (2013.01)
USPC ................................. 701/3; 701/39

(58) Field of Classification Search
USPC ...................................... 701/3, 29
See application file for complete search history.

(56) References Cited

U.S. PATENT DOCUMENTS

| 3,870,253 | A | * | 3/1975 | Leidy et al. ................. 244/46 |
| 4,420,808 | A | * | 12/1983 | Diamond et al. ............... 701/4 |
| 4,797,829 | A | * | 1/1989 | Martorella et al. ............. 701/3 |
| 5,135,186 | A | * | 8/1992 | Ako ......................... 244/78.1 |
| 5,424,950 | A | * | 6/1995 | Jackson ....................... 701/4 |
| 5,769,359 | A | * | 6/1998 | Rutan et al. ............... 244/76 R |
| 5,806,805 | A | * | 9/1998 | Elbert et al. ................ 244/195 |
| 6,439,512 | B1 | * | 8/2002 | Hart ........................ 244/178 |
| 7,424,988 | B2 | * | 9/2008 | McDonnell .................. 244/82 |
| 7,567,862 | B2 | * | 7/2009 | Pelton et al. ............... 701/33.8 |

(Continued)

FOREIGN PATENT DOCUMENTS

| EP | 2026158 | 2/2009 |
| FR | 2936067 | 9/2010 |

OTHER PUBLICATIONS

French Patent Office, Preliminary Search Report for FR 1156900, Feb. 27, 2012 (2 pgs.).

*Primary Examiner* — Calvin Cheung
(74) *Attorney, Agent, or Firm* — Wood, Herron & Evans, LLP (57) ABSTRACT

A detection device determines whether an uncontrolled movement of a control surface of an aircraft is occurring. The device includes means for calculating the difference between a theoretical command and an actual command in order to form a residual value, and means for detecting an uncontrolled movement of the control surface, if a comparison value depending on this residual value is greater than a threshold value If the comparison value is greater than the threshold value during a confirmation time, then the uncontrolled movement of the control surface of the aircraft is confirmed.

15 Claims, 3 Drawing Sheets

(56) References Cited

U.S. PATENT DOCUMENTS

| | | | |
|---|---|---|---|
| 8,380,473 B2* | 2/2013 | Falangas | 703/8 |
| 2004/0098140 A1* | 5/2004 | Hess | 700/3 |
| 2004/0251383 A1* | 12/2004 | McDonnell | 244/82 |
| 2005/0173595 A1* | 8/2005 | Hoh | 244/223 |
| 2005/0234606 A1* | 10/2005 | Giazotto | 701/3 |
| 2006/0043242 A1* | 3/2006 | Benson | 244/175 |
| 2007/0124038 A1* | 5/2007 | Goupil | 701/29 |
| 2007/0135975 A1* | 6/2007 | Stange et al. | 701/3 |
| 2008/0203224 A1* | 8/2008 | Yount et al. | 244/99.5 |
| 2009/0127400 A1* | 5/2009 | Lavretsky et al. | 244/195 |
| 2009/0292405 A1* | 11/2009 | Najmabadi et al. | 701/3 |
| 2009/0326739 A1* | 12/2009 | Goupil et al. | 701/3 |
| 2010/0001678 A1 | 1/2010 | Potter et al. | |
| 2010/0127132 A1* | 5/2010 | Kirkland | 244/76 R |
| 2010/0131238 A1* | 5/2010 | Boldrin et al. | 702/182 |

* cited by examiner

METHOD AND DEVICE FOR DETECTING AN UNCONTROLLED MOVEMENT OF AN AIRCRAFT CONTROL SURFACE

TECHNICAL FIELD

The present invention relates to a method and a device for detecting an uncontrolled movement of an aircraft control surface that is servo-controlled in position by a feedback loop, as well as an electrical flying command system comprising such detection device.

The present invention applies to a feedback loop:
  being adapted to control in position an aircraft control surface of any type, including ailerons, spoilers or a horizontal rudder for example;
  being part of an electrical flying command system of the aircraft; and
  comprising:
    said control surface being mobile and the position of which with respect to the aircraft is adjusted by at least one actuator;
    said actuator adjusting the position of said control surface as a function of at least one actuating order being received;
    at least one sensor measuring the effective position of said control surface; and
    a calculator (for flying commands) for developing a control surface actuating order, being transmitted to said actuator, from said measured effective position and a command order calculated from the pilot's action on a command stick or from the action of the automatic pilot and of the inertial state of the aircraft.

In the scope of the present invention, "a control surface uncontrolled movement" means a movement being not controlled of this control surface (i.e. a movement which is not generated by any control of a means for its command on the aircraft), thereby leading the latter up to its abutment if such phenomenon is not detected and stopped.

The present invention thus relates to the detection of an uncontrolled movement of at least one aircraft control surface due at least to a failure occurring in the associated feedback position control loop within a flying command system.

BACKGROUND

It is known that the flying command calculators perform amongst other, the position feedback control of the control surfaces in an aircraft, for example a transport airplane. The control surface movement is generated by an actuator that could be either in an active mode or in a passive mode. Two actuators are generally provided by a control surface. A so-called "master" calculator performs the feedback control by sending a command to the active actuator. The other actuator, being associated with a second so-called "slave" calculator is forced into a passive mode to follow the control surface movement. If the master calculator detects, thru specific monitoring means, a failure, it switches the active actuator into a passive mode and hands over to the slave calculator that controls the second actuator (switched then into an active mode).

Within the feedback control loop in position, from the flying command calculator to the actuator, including at the level of both such elements, different members or elements are found, which are adapted to generate, in a failing mode, a signal leading to the uncontrolled movement of the control surface. The uncontrolled movement of a control surface, depending on the aircraft flying point, can have consequences on the guiding of the latter and on the sizing of the structure thereof due to the loads being generated. It is thus necessary to be in a position to detect and passivate such a failure very quickly, i.e. before the position of the control surface is too important, the passivation action consisting in limiting or stopping the effect of the failure so as to avoid the propagation thereof.

SUMMARY OF THE INVENTION

The object of the present invention aims at remedying the above mentioned drawbacks. It relates to a method being particularly sturdy and which is applicable to any aircraft type with electrical flying commands so as to detect at least one uncontrolled movement of a control surface in the aircraft, which is controlled in position by a feedback loop, said method allowing such uncontrolled movement to be detected whatever the dynamical profile thereof and whatever the origin of the failure.

With this end in view, according to the invention, said detection method for an uncontrolled movement of a control surface which is servo-controlled in position by a feedback loop belonging to an electrical flying command system of the aircraft and comprising:
  said control surface being mobile and the position of which with respect to the aircraft is adjusted by at least one actuator;
  said actuator that adjusts the position of said control surface as a function of at least one actuating order received as a feedback command;
  at least one sensor measuring the effective position of said control surface; and
  at least one calculator creating a control surface command order, that receives said measured effective position and deducts from it an actuating order that is transmitted to said actuator as a feedback command,
is remarkable in that on an automatic and repetitive way, the following sequence of successive steps is followed:
  a) a theoretical feedback current being representative of said feedback command emitted bay said calculator (i.e. similar or identical to the latter, as detailed hereinunder) is determined;
  b) a parameter being representative of the feedback command is measured with the help of at least one auxiliary sensor at the level of the mechanization of such command into said actuator and an effective feedback current is determined from the so-measured parameter;
  c) the difference between said theoretical feedback current determined at step a) and said effective feedback current determined at step b) is calculated so as to form an error signal; and
  d) an uncontrolled movement of said control surface is detected if a comparison value depending on said error signal is higher than a threshold value during at least one confirmation time.

Thus, thanks to the invention, the actual operation of the feedback loop being monitored (which is illustrated by the effective feedback current measured by the auxiliary sensor relative to the control surface command, with a theoretical operation expected outside any failure (with is illustrated by said theoretical feedback current emitted by the calculator, thereby allowing any uncontrolled movement to be put in evidence when it occurs. This comparison is carried out by calculating a comparison value as detailed below.

Consequently, thanks to the invention, it is possible to detect, in the feedback loop being monitored, any uncontrolled movement of a control surface being servo-controlled, whatever the origin of the failure. Moreover, such detection is particularly sturdy, since it does not cause any false alarms and it applies to any aircraft type.

The method according to the invention thus allows every control surface uncontrolled movement (i.e. every dynamical profile) to be very quickly detected. It is thus possible to passivate a failure at the origin of such uncontrolled movement very quickly, i.e. before the control surface position is too important, as detailed below. This enables to limit the maximum value reached by the control surface upon such a failure.

In a simplified embodiment, said theoretical feedback current directly corresponds to said current emitted by the calculator (to control the actuator), said current being preferably calculated by a usual command unit COM of said calculator.

Moreover, in another embodiment, at step a), said theoretical feedback current is calculated thru auxiliary calculating means, and this, on the same way as said calculator (for example, the common unit COM thereof) calculates said emitted current. Preferably, these auxiliary calculation means are part of a usual monitoring unit MON of said calculator.

In addition, in this last embodiment, at step a), said calculated theoretical feedback current is advantageously limited so as to make monitoring sturdy in particular relative to the stress saturations of the actuator.

Moreover, advantageously, the threshold value and the confirmation time used in the processings can be:
either fixed and predetermined;
or variable depending on the particular conditions being detailed below.

Furthermore, advantageously, it is checked if particular activation conditions are fulfilled and the set of said steps a) to d) is implemented when such activation conditions are fulfilled.

Moreover, in a simplified embodiment, said comparison value used at step d) simply corresponds to said error signal calculated at step c).

In contrast, in a preferred embodiment, an intermediate step is implemented between said steps c) and d), upon which said error signal is filtered to obtain said comparison value. In this case, advantageously, a Kalman filter is used, control parameters of which are optimized to improve the response and the stability of the filter as detailed below.

Preferably, in the case of a detection of an uncontrolled movement at step d), said actuator is automatically switched into a passive mode and an auxiliary actuator (which is also intended to the control surface command and which was previously in a passive mode) is automatically switched into an active mode, in which it has then as a function to adjust the position of said control surface (instead of said actuator).

Moreover, in the case of a detection of an uncontrolled movement at step d), a detection piece of information can be emitted, specifically at destination of usual storing means that store information to be subsequently used by maintenance operators.

The present invention also relates to a detection device for at least one uncontrolled movement of a control surface (aileron, spoiler, horizontal rudder, rudder) of an aircraft, which is servo-controlled in position by a feedback loop of the above mentioned type.

According to the invention, said detection device is remarkable in that it comprises:
first means to determine a theoretical feedback current representative of the feedback command emitted by the calculator;
at least one auxiliary sensor being connected to the actuator and which is provided so as to measure a parameter representative of the feedback command from which an effective feedback current is determined;
second means to calculate the difference between said theoretical feedback current and said effective feedback current so as to create an error signal; and
third means to detect an uncontrolled movement of the control surface if a comparison value depending on said error signal is higher than a threshold value during at least one confirmation time.

In a first particular embodiment, said actuator controlling the position of said control surface is a hydraulic actuator, and said auxiliary sensor is arranged at the level of a slide of the servovalve of said hydraulic actuator (and measures the position of the latter, as a parameter).

Moreover, in a second particular embodiment, said actuator that adjusts the position of said control surface is an electrical power actuator, i.e. using an electrical power to operate, and said auxiliary sensor is arranged at the level of an electrical engine of the latter (and measures the rotation speed of said electrical engine, as a parameter).

Said electrical power actuator may correspond to an electro-hydrostatic actuator of the EHA ("Electro-Hydrostatic Actuator") type or to an electromechanical actuator of the EMA ("Electro-Mechanical-Actuator) type. It can also be an electrical backup hydraulic actuator of the EBHA ("Electrical Backup Hydraulic Actuator) type when it operates in an electrical mode.

The detection device according to the invention allows detecting, automatically and quickly, uncontrolled movement failures in the feedback loop in position of an aircraft control surface so that, if a failure detection is confirmed, a reconfiguration can be automatically carried out toward a healthy redundant piece of equipment.

Said detection device is advantageous since it enables to limit the maximum values reached in a case of an uncontrolled movement and thus to improve the controllability of the aircraft and to reduce the structural loads, in the case of a failure.

The general monitoring principle being implemented thus comprises two successive steps:
a generation of an error signal in comparison with a theoretical or modelled feedback current created in the calculator with information from the mechanization in the command actuator of the calculator and representative of the feedback current actually applied on the actuator; and
a decision taking aiming at detecting and confirming the presence of a failure on the error signal.

The present invention also relates to an electrical flying command system of an aircraft, of the type comprising:
at least one usual means (comprising for example a command stick) to generate a control surface command order for at least one control surface of the aircraft; and
at least one feedback loop in position of such control surface, of the above mentioned type.

According to the invention, this electrical flying command system is remarkable in that it comprises, in addition, at least one detection device such as previously described.

BRIEF DESCRIPTION OF THE DRAWINGS

The FIGS. of the accompanying drawings will make well understood how the invention can be implemented. On these FIGS., identical annotations denote similar elements.

DETAILED DESCRIPTION

Figure 1:
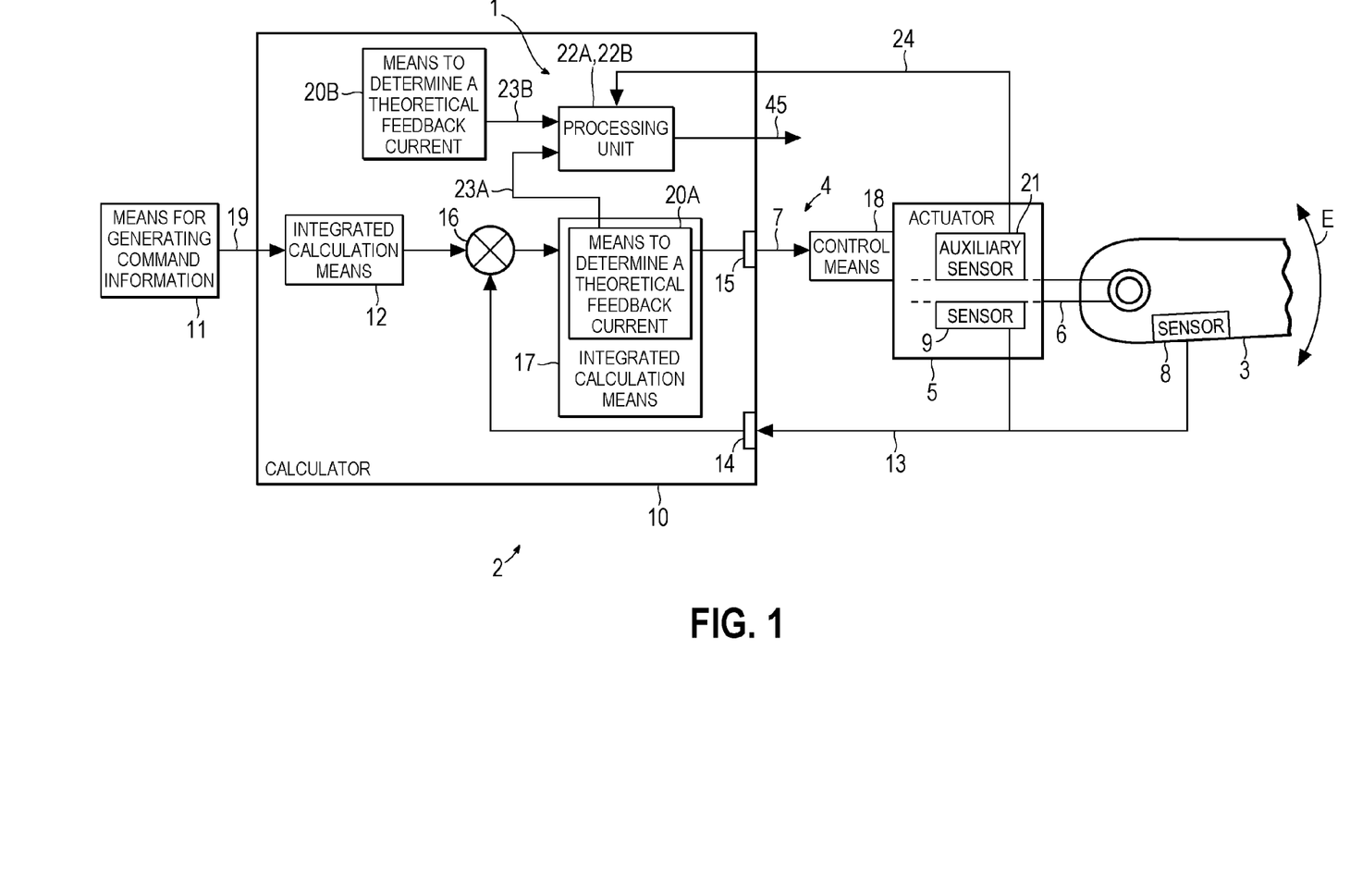
FIG. 1 illustrates schematically a feedback loop in position of an aircraft control surface, comprising a detection device according to the invention.

The device 1 according to the invention is intended to detect at least one uncontrolled movement of a control surface 3 (aileron, spoiler, horizontal rudder, rudder) of an aircraft, in particular a transport airplane, which is servo-controlled in position by a feedback control loop 2 (represented on FIG. 1).

Usually, this feedback loop 2 is part of an electrical flying command system 4 of the aircraft (not shown) and comprises:
- said control surface 3 being mobile while being able to be pointed as illustrated by a double arrow E on FIG. 1 and the position of which is adjusted with respect to the structure of the aircraft by at least one usual actuator 5;
- said actuator 5 adjusting the position of said control surface 3, for example thru a rod 6 acting on the latter, as a function of at least one actuating order received thru a connection 7;
- at least one sensor 8, 9 measuring the effective position of said control surface 3. Indeed, it can be a sensor 8 being directly associated with the control surface 3 and/or a sensor 9 measuring for example the movement of the rod 6 of the actuator 5; and
- a calculator 10, for example, a flying command calculator:
  receiving command information from means 11 thru a connection 19. These means 11 are usual means for generating command information and comprises for example a command stick being able to be acted on by a pilot of the aircraft and inertial sensors;
  usually developing a control surface command order thru an integrated calculation means 12 containing piloting laws and using for such developing command information (for example, the action of the pilot on the command stick, parameters indicating the aircraft position around its gravity centre, load factors it is submitted to) received from said means 11;
  receiving the effective position measured by the sensor(s) 8 and 9 thru a connection 13 via an input 14 of the analogue or digital type;
  calculating from preceding information (control surface command order and effective position being measured) said actuating order thru an integrated calculation means 17 taking a predetermined gain into account; and
  transmitting this actuating order (under the form of a feedback command) to control means 18 (for example, a servovalve or an electrical engine) of the actuator 5 thru the connection 7 via an input 15 of the analogue or digital type.

Said electrical flying command system 4 comprises, beside said feedback loop 2, the device 1 according to the invention which is intended to detect at least one uncontrolled movement of the control surface 3, and this, whatever the dynamical profile thereof and whatever the origin of the failure.

Figure 2:
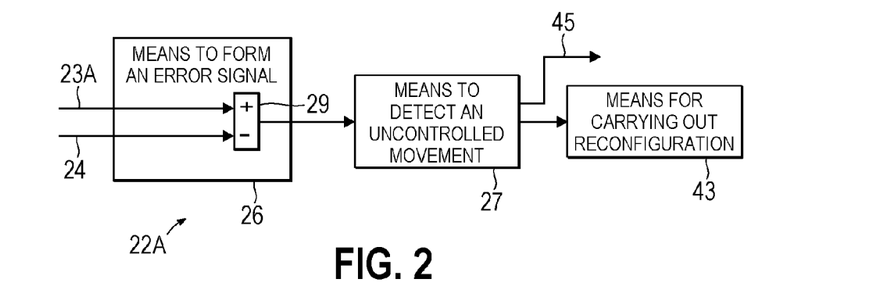
FIG. 2 is a block diagram of a detection device in accordance with a first embodiment of the invention.
Figure 3:
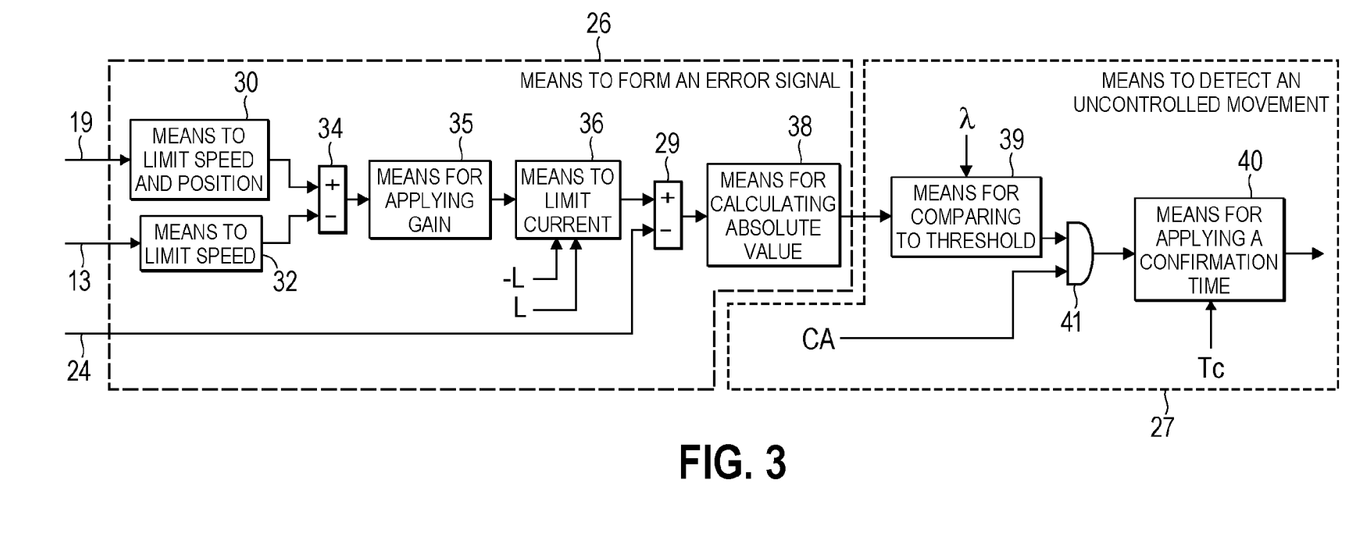
FIG. 3 illustrates schematically particular means of a detection device according to the invention.
Figure 4:
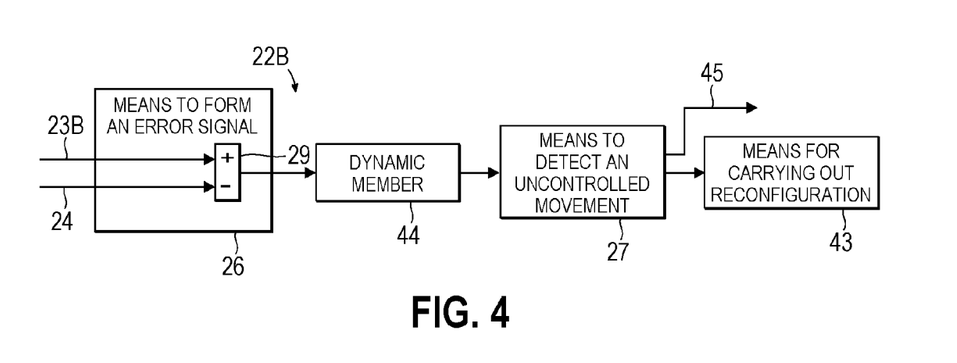
FIG. 4 is a block diagram of a detection device in accordance with a second embodiment of the invention.

To do so, said detection device 1 comprises as shown on FIG. 1:
- means 20A, 20B to determine a theoretical feedback current corresponding to said feedback command emitted by said calculator 10;
- at least one auxiliary sensor 21 which is connected to said actuator 5 and which is formed so as to measure a parameter relative to the movement of said actuator 5, from which an effective feedback current is determined; and
- a processing unit 22A, 22B which is connected thru a connection 23A, 23B to said means 20A, 20B and thru a connection 24 to said auxiliary sensor 21 and which comprises, as shown on FIGS. 2 to 4, specifically:
  means 26 to form an error signal from the difference between said theoretical feedback current and said effective feedback current; and
  means 27 to detect an uncontrolled movement of the control surface 3 if a comparison value depending on said error signal is higher than a threshold value λ during at least one confirmation time Tc.

Consequently, said device 1 compares the actual operation of the feedback loop being monitored (which is illustrated by the effective feedback current measured by the auxiliary sensor 21) relative to the command of the control surface 3, to a theoretical operation being expected outside a failure (with is illustrated by said theoretical feedback current emitted by means 20A, 20B), thereby allowing an uncontrolled movement, i.e. a not ordered movement, of the control surface 3 to be put in evidence the case being.

Consequently, said device 1 is in a position to detect very quickly, in the feedback loop being monitored, every uncontrolled movement type (i.e. every dynamical profile) of the control surface being servo-controlled, and this, whatever the origin of the failure. It is thus possible to passivate such failure very quickly, i.e. before the position of the control surface 3 is too important, as detailed hereinunder. This allows the maximum value reached by the control surface 3 to be limited.

Moreover, this detection is particularly sturdy, since it does not cause any false alarms and is applicable to any type of aircraft.

In a particular first embodiment, said actuator 5 which adjusts the position of said control surface 3 is a usual hydraulic actuator. In such a case, said auxiliary sensor 21 is arranged at the level of a slide of the servovalve of said hydraulic actuator 5 (and it measures the position of the latter, as a parameter). This position is usually converted, thru means belonging to said processing unit 22A, 22B, into an electrical current representing said effective feedback current.

Further, in a particular second embodiment, said actuator 5 which adjusts the position of said control surface 3 is a usual electrical power actuator, i.e. an actuator using electrical power to operate. In this case, said auxiliary sensor 21 is arranged at the level of an electrical engine of the latter (and it measures the rotation speed of said electrical engine, as a parameter). Such rotation speed is then converted, in a usual way, thru means belonging to said processing unit 22A, 22B, in an electrical current representing the effective feedback current.

Said electrical power actuator can correspond to an electro-hydrostatic actuator of the EHA ("Electro-Hydrostatic Actuator") type or to an electromechanical actuator of the EMA ("Electro-Mechanical Actuator") type. It can also be an electrical backup hydraulic actuator of the EBHA ("Electrical Backup Hydraulic Actuator") type when it operates in an electrical mode. An EBHA actuator is a hybrid actuator comprising the characteristics both of a usual hydraulic servocommand and an electro-hydrostatic actuator of the EHA type. In a nominal situation (outside failure), the EBHA actuator operates like a usual servocommand. In contrast, in the case of a failure affecting the hydraulic mode, such EBHA actuator switches into an electrical mode and operates like an EHA actuator.

In a simplified embodiment, said theoretical feedback current directly represents said current emitted by the calculator 10 (to control the actuator) and calculated preferably by a usual command unit COM 20A of said calculator 10.

Moreover, in another embodiment, said theoretical feedback current is calculated by auxiliary calculation means 20B, and this, on the same way as said calculator 10 (the command unit COM thereof) calculates said emitted current (the calculation mode is similar, but different redundant means are used). Preferably, these auxiliary calculation means 20B are part of a usual monitoring unit MON of said calculator 10.

The general monitoring principle implemented by the device 1, the same for every aircraft, is thus to compare the calculated current with a measured current via a piece of information representative of the mechanization of the command (for example the position of the slide of the servovalve for a servocommand or the speed of the electrical engine for an actuator of the EHA or EMA type), followed by a decision taking step. To implement this comparison, the means 26 comprise a calculation element 29 to calculate a current difference.

On FIG. 3, a preferred embodiment of the means 26 and 27 has been represented. In this preferred embodiment, the means 26, on the one side, comprise the means 20B to determine the theoretical feedback current, and, on the other side, calculate said error signal.

The order received by the connection 19 is generally limited in speed and in position to operational maximum values (by means 30) so as to make monitoring sturdier.

The position received by the connection 13 is in general also limited in position (by means 32) to operational maximum values.

In a particular embodiment, as indicated above, monitoring is performed in a MON unit. The current $i_{MON}$ is calculated identical to the usual current $i_{COM}$ by using the order $u_{MON}$ calculated by the MON unit and either a position $x_{MON}$ available in such unit (in general, the position of the control surface measured by a surface position sensor of the RVDT (for "Rotary Variable Differential Transducer") type, or another position piece of information which may be the one of the actuator rod (supplied by the rod elongation sensor of the LVDT (for "Linear Variable Differential Transducer") type, the position measured on a adjacent actuator (LVDT or RVDT), a redundant position at the level of the actuator being monitored or a position estimated from a behavioural model of the control surface 3 coupled with the actuator 5.

It can be written for example in a discrete annotation where k is the time index:

$$i_{MON}(k)=K(u_{MON}(k)-x_{MON}(k))$$

The preceding difference is calculated by means 34 and the gain K is applied by means 35.

The error signal $\epsilon(k)$ to be monitored is thus written:

$$\epsilon(k)=i_{réel}(k)-i_{MON}(k)=i_{réel}(k)-K(u_{MON}(k)-x_{MON}(k))$$

As indicated above, in another embodiment, monitoring can also be performed in the COM unit. In this case, the calculated current is identical to the current being used.

The calculated current $i_{MON}$ can be if necessary treated so as to be the most adequate with the value to which it will be compared. For example, the characteristics of the sensor 21 measuring the monitored magnitude can be modelled and applied on the calculated current.

The calculated and treated current is then limited (limitation at ±L on FIG. 3) by means 36 so as to make the monitoring sturdy in particular on stress saturations of the actuator.

In fact, in the case of a stress saturation (for example very big aerodynamic stresses on the control surface 3), the position may not reach the order and the deviation between the two pieces of information could then become higher than the threshold and thereby lead to false detections.

Furthermore, such limitation must be sufficiently big so as to also detect locks affecting the mechanization of the command.

In order to avoid the false detections with respect to the stress saturation, a limitation L which is such that L<λ+ maximum value of the current equivalent is used.

To be able to detect a lock close to 0 mA for the control current, L must imperatively be higher than λ.

Considering a certain margin reported to the uncertainties of the measuring sensors, in a particular embodiment, there is used for example:

$$\lambda+\sigma_0<L<\lambda+8+/-\sigma_{max}$$

with:
 $\sigma_0$ the measuring error for a command current of 0 mA; and
 $\sigma_{max}$ the maximum measuring error.

Such limitation can be variable depending on different external conditions so as to make the monitoring sturdier or more efficient. This limitation can depend specifically on aerodynamic stresses (in particular when they are very important or very little important) applied on the control surface 3 or the operation phase (in particular during a transition phase upon the start up).

In this case, the calculation rules for the value of L cannot be respected if only the conditions leading to such value modification are coherent with the constraints determining such rules. For example, the limitation L can become lower than the monitoring threshold for a certain time, if it is acceptable during this period not to detect a lock for a command current of 0 mA. Conversely, the limitation L can be higher than the threshold (+8 mA) if it is ensured to manoeuver in a field where saturation is not possible.

The value of the information representative of the mechanization of the command $i_{COM}$ (received by the connection 24) is then subtracted (by the means 29) from the calculated, treated and limited current $i_{MON}$.

The absolute value (calculated by means 38) of the value resulting from such subtraction is then compared (by means 39) to at least one positive threshold λ. Such threshold λ is determined as a function of static errors (the precision of the current generator, the measuring precision of the sensors, the precision of each acquisition, . . . ), of dynamic errors (the asynchronisms between the COM and MON ways, since each way has its own clock, the delay between the physical acquisition of information and their software use, . . . ), and a confirmation time Tc.

Indeed, a confirmation time Tc is applied to the result (via means 40) before a lock (or a confirmation) of the failure is performed.

The couples (threshold λ)/confirmation time Tc) are selected so as:
 on the one side, to be sturdy to errors, either static or dynamic; and
 on the other side, to be able to reach the objectives allocated to the monitoring.

The threshold λ can specifically depend for example on:
 the clearance of the control surface 3;
 the sideslip of the aircraft;
 possible turbulences and wind; and
 a downgraded mode.

An activation condition CA of the monitoring is applied (via a logical gate AND 41). This condition tightly depends on the state of the system and of the actuator 5 being monitored: the actuator is in an active state, the auxiliary sensor 21 is supplied, . . . .

Once the failure is detected and locked, the failing actuator 5 is passivated and a reconfiguration (by means 43) is carried out on the adjacent actuator which becomes then active.

In fact, there are in general provided two actuators 5 for each control surface 3. A so-called "master" calculator performs the feedback control by sending a control current to an actuator which is active. The other actuator, associated with a second so-called "slave" calculator is forced into a passive mode so as to follow the movement of the control surface 3. If the device 1 detects a failure (leading to an uncontrolled movement of the control surface 3), the means 43 switch the active actuator into a passive mode and hand over to the slave calculator which controls the second actuator switched into an active mode.

Moreover, in the case of detection of an uncontrolled movement by the means 27, the device 1 can emit via a connection 45 a detection piece of information, specifically at destination of usual storing means (not represented) which store information to be subsequently used by maintenance operators.

Preferably, in case of a detection of an uncontrolled movement, the device 1 automatically performs the above mentioned reconfiguration and does not warn the pilot so as not to give him too many information. However, if the situation is such that the control surface 3 is no more usable (upon an uncontrolled movement or a failure of every actuator 5 of the control surface 3 for example), the device 1 can emit via the connection 45 an alarm signal at destination of the crew.

Furthermore, in a preferred embodiment represented on FIG. 4, the processing unit 22B is completed relative to the processing unit 22A by inserting, between the error signal generation means 26 and the decision taking means 27, of a dynamic member 44 filtering the error signal so as to improve the performances and the robustness of the detection.

The monitoring according to the first embodiment of FIG. 2 is made in a purely static context (with no memory). An error signal is generated and compared to a threshold $\lambda$ (determined as a function of the set of propagated errors) and the failure is declared after a confirmation time Tc.

Let's denote $\epsilon(k)$ for the error signal which is the object of the decision test (for example, in a particular embodiment, the difference between the current calculated by the MON unit and the position given by the slide sensor of the servovalve of a hydraulic servocommand, which is an image of the current sent by the COM unit). The index k implies a discrete time operation.

The preferred embodiment of FIG. 4 aims at improving the monitoring loop being described hereinabove by inserting upstream from the threshold, between the calculation of the error signal and the take off decision, a member 44 the role of which is to filter the signal while causing with the shortest possible transient being compatible with the operational constraints. An advantage of this solution is that the monitoring structure described hereinabove referring to FIGS. 2 and 3 is entirely kept.

Let's consider $\epsilon(k)$ and $\hat{\epsilon}(k)$ the respectively input and output signals (the filter signal) of the dynamic block 44. In the new configuration, the decision taking (threshold and confirmation time) occurs on the signal $\hat{\epsilon}(k)$.

This dynamic member 44 corresponds to a particular Kalman filter, the calculation is made from the modelling in the state space of the effect of an uncontrolled movement.

A modelling of the effect of an uncontrolled movement is presented hereinafter.

Schematically, the effect of an uncontrolled movement results in a drift $$y(t)=at+b \qquad (1)$$

A quick or slow drift corresponds respectively to a quick uncontrolled movement (a is big) or a slow uncontrolled movement (a is small). The term b represents the start point of the uncontrolled movement.

The signal y(t) can be represented with two state variables $x_1$ and $x_2$:

$$\begin{cases} \dot{x}_1(t) = 0 \\ \dot{x}_2(t) = x_1(t) \\ y(t) = x_2(t) \end{cases} \qquad (2)$$

the initial conditions of which are:

$$\begin{cases} x_1(0) = a \\ x_2(0) = b \end{cases} \qquad (3)$$

If such continuous model is discretized with a sampling period equal to T, by using Euler's method:

$$\dot{x}(t) = \frac{x(k+T) - x(k)}{T} \qquad (4)$$

there are obtained:

$$\dot{x}_1(t)=0 \Rightarrow x_1(k+T)=x_1(k) \qquad (5)$$

$$\dot{x}_2(t)=x_1(t) \Rightarrow x_2(k+T)=x_2(k)+Tx_1(k) \qquad (6)$$

By writing this state model under a standard form, it becomes:

$$\begin{cases} \begin{bmatrix} x_1(k+1) \\ x_2(k+1) \end{bmatrix} = \begin{bmatrix} 1 & 0 \\ T & 1 \end{bmatrix} \begin{bmatrix} x_1(k) \\ x_2(k) \end{bmatrix} + \begin{bmatrix} w_1(k) \\ w_2(k) \end{bmatrix} \\ \varepsilon(k) = [0 \ 1] \begin{bmatrix} x_1(k) \\ x_2(k) \end{bmatrix} + v(k) \end{cases} \qquad (7)$$

the state matrices of which are:

$$A = \begin{bmatrix} 1 & 0 \\ T & 1 \end{bmatrix} \qquad (8)$$

$$C = [0 \ 1] \qquad (9)$$

$$B = 0 \qquad (10)$$

$$D = 0 \qquad (11)$$

In this case, A is the transition matrix, B the command matrix, C the observation matrix and D the direct transmission matrix. There is some interest to the modelling of the dynamic behavior of the error signal $\epsilon(k)$ in the state space, the process generating such signal (integrating the forced input u(k) and the action channel thereof) being not modelled, thereby explaining the relations (10) and (11).

Moreover, v(k) and w(k) respectively represent the measuring noise and the state noise supposed to be white and Gaussian sequences being stationary with an average of zero and with covariance matrices R and Q, respectively.

The Kalman filtering is presented hereinafter in a stationary speed.

$\hat{\epsilon}(k)$ is generated by applying a Kalman filtering based on the model (7). If K is the Kalman gain in stationary speed, the observer for reconstructing $\hat{\epsilon}(k)$ is written on the following way:

$$\begin{cases} \hat{x}(k+1) = A\hat{x}(k) + K(\varepsilon(k) - \hat{\varepsilon}(k)) \\ \hat{\varepsilon}(k) = C\hat{x}(k) \end{cases} \quad (12)$$

The relationship between $\hat{\epsilon}(k)$ and $\epsilon(k)$ becomes:

$$\hat{\epsilon}(k) = (C(zI - A + KC)^{-1}K)\epsilon(k) \quad (13)$$

The transfer function is denoted:

$$F(z) = C(zI - A + KC)^{-1}K \quad (14)$$

F(z) is a discrete filter of the LTI ("Linear Time in variant") type of the second order, the analytic expression of which can be easily calculated by inserting the equations (8) and (9) into the equation (14):

$$F(z) = [0\ 1] \begin{bmatrix} z-1 & K_1 \\ -T & z-1+K_2 \end{bmatrix}^{-1} \cdot \begin{bmatrix} K_1 \\ K_2 \end{bmatrix} \quad (15)$$

Or also:

$$F(z) = \frac{TK_1 + (z-1)K_2}{(z-1+K_2)(z-1) + K_1 T} \quad (16)$$

with $K_1$ and $K_2$ the filter adjusting parameters. Their adjustment has thus some influence on the improvements made by the filter and specifically the value reached by the control surface 3 upon the detection of an uncontrolled movement.

It is to be noticed that:

- the filter (16) presents a unity static gain, i.e. in a permanent speed z=1, $\epsilon(k) = \hat{\epsilon}(k)$;
- there is a couple ($K_1$, $K_2$) providing the re-copy of $\epsilon(k)$, with two delayed sampling periods;
- as far as the implementation is concerned, the equation (16) defines a recurrent relationship between $\hat{\epsilon}(k)$ and $\epsilon(k)$ (at each sampling period k, the value of $\hat{\epsilon}(k)$ is calculated as a function of the values of $\hat{\epsilon}(k-1)$, $\hat{\epsilon}(k-2)$, $\epsilon(k-1)$ and $\epsilon(k-2)$, whence the memory effect; and
- for the operational implementation of the filter, a systematic adjustment method for these two degrees of freedom (free parameters) $K_1$ and $K_2$ is necessary.

There are shown hereinafter one step for optimizing the parameters $K_1$ and $K_2$ to obtain a good response of the filter (velocity and capacity of filtering) while providing its stability.

The stability constraints are of the "linear inequality" type deducted from the Jury criterion. A discrete linear filter is stable if the poles thereof are all in the unit radius circle in the complex plane. The Jury Criterion is an algebraic criterion giving the necessary and sufficient conditions so that the roots of a polynomial have a module strictly lower than 1. The stability conditions are thus deducted by applying such criterion to the denominator of the equation (16) so as to deduct the stability constraints.

This step amounts to solve a non linear optimization problem under linear non equal constraints:

$$(\hat{K}_1, \hat{K}_2) = \arg\min_{K_1, K_2} \|M_0 - M(K_1, K_2)\|_l$$

under stability constraints:

$$\begin{cases} K_1 > 0 \\ K_1 T - 2K_2 + 4 > 0 \\ K_1 T - K_2 + 2 > 0 \\ -K_1 T + K_2 > 0 \end{cases} \quad (17)$$

where M and $M_0$ respectively represent the output signal of the filter (16) and a reference signal. I=1, 2 corresponds to the standard being used.

Such optimization is made by a method of the "model matching" type (continuation of the reference model). A "target" response of the filter $M_0$ is selected and, via an appropriate optimization process, the free parameters of the system ($K_1$ and $K_2$ here) are adjusted so that the response of the system M follows as near as possible the response of the reference model. The quadratic deviation (I=2) or the amplitude deviation (I=1) is thus minimized between the target response and the actual output of the filter (obtained recursively with the relationship (16)), while remaining in the stability region. Standard optimization techniques can be used to solve this problem. The output of this optimization process is the couple ($\hat{K}_1, \hat{K}_2$) being looked at. This couple of parameters is then coded in the calculator for the real time monitoring.

A first alternative embodiment is presented hereinafter.

If $K_1 \approx 0$ in the equation (16), the expression of F(z) becomes:

$$F(z) = \frac{K_2}{z - 1 + K_2} \quad (18)$$

This particular case corresponds to the case where the signal $\epsilon(k)$ is modelled thru an expedient (a constant) in the state space. A Kalman filter is obtained in a stationary speed of the first order.

As previously, it is convenient to find the optimum value of the gain $K_2$ provides a good compromise between the filtering capacity and the transient introduced by the filter. In order to guarantee the filter stability and to obtain a hyper dampened response, the gain adjustment range in the interval (0, 1).

The value of $K_2$ reducing at the most the position reached by the control surface 3 after a detection of a failure for different uncontrolled movement speeds is retained for its implementation in the device 1.

Moreover, a second alternative embodiment is presented hereinafter.

In such alternative, the variable gain Kalman filter calculated on the base of the model (7) is considered. The filtering equations are written in this case as follows:

$$\begin{cases} K = P_{k+1/k} C^t (CP_{k+1/k} C^t + R)^{-1} \\ \hat{x}_{k+1/k+1} = \hat{x}_{k+1/k} + K(\varepsilon_{k+1} - C\hat{x}_{k+1/k}) \\ P_{k+1/k+1} = (I - KC) P_{k+1/k} \\ \hat{x}_{k+1/k} = A\hat{x}_{k/k} \\ P_{k+1/k} = AP_{k/k} A^t + Q \\ \hat{\varepsilon}_k = C\hat{x}_{k+1/k+1} \end{cases} \quad (19)$$

where K is the gain of the Kalman filter:

$$K = \begin{bmatrix} K_1 \\ K_2 \end{bmatrix} \quad (20)$$

The relation between ϵ(k) and $\hat{\epsilon}$(k) is thus of a LTV ("Linear Time Variant) type.

$P_{k+1/k}$ and $P_{k+1/k+1}$ are the covariance matrices respectively in the prediction and correction phases (updating or filtering), and the matrices $\hat{x}_{k+1/k}$ and $\hat{x}_{k+1/k+1}$ respectively represent the state estimates being predicted and updated.

As indicated above, Q and R are respectively the weighing matrices for the state noise w(k) and the measuring noise v(k).

The value of R can be fixed depending on the characteristics of the sensor noise.

The selection of the matrix Q conditions the filter performances:

$$Q = \begin{bmatrix} Q_1 & 0 \\ 0 & Q_2 \end{bmatrix} \quad (21)$$

Such matrix defines the attraction basin of the Kalman filter and has a strong influence on the passband of the filter. A heuristic approximate value of (Q1, Q2) can be obtained thru simulation trials and by using an iterative refining process.

The invention claimed is:

1. A detection method for an uncontrolled movement of a control surface which is servo-controlled in position by a feedback loop belonging to an electrical flying command system of the aircraft and comprising:
   the control surface being mobile and the position of which with respect to the aircraft is adjusted by at least one actuator;
   the actuator that adjusts the position of the control surface as a function of at least one actuating order received as a feedback command;
   at least one sensor measuring the effective position of the control surface; and
   at least one calculator developing a control surface command order, that receives the measured effective position and deducts from it an actuating order that is transmitted to the actuator as a feedback command,
   a method where on an automatic and repetitive way, the following sequence of successive steps is followed:
   (a) a theoretical feedback current being representative of the feedback command emitted bay the calculator is determined;
   (b) a parameter being representative of the feedback command is measured with the help of at least one auxiliary sensor at the level of the mechanization of such command into the actuator and an effective feedback current is determined from the measured parameter;
   (c) the difference between the theoretical feedback current determined at step (a) and the effective feedback current determined at step (b) is calculated so as to form an error signal; and
   (d) an uncontrolled movement of the control surface is detected if a comparison value depending on the error signal is higher than a threshold value during at least one confirmation time.

2. The method according to claim 1, wherein at step (a), the theoretical feedback current corresponds to the current emitted by the calculator.

3. The method according to claim 1, wherein at step (a), the theoretical feedback current is calculated thru auxiliary calculation means on the same way as the calculator calculates the emitted current.

4. The method according to claim 3, wherein at step (a), the calculated theoretical feedback current is limited.

5. The method according to claim 1, wherein at least one of the following values: threshold value and confirmation time, is variable as a function of particular conditions.

6. The method according to claim 1, wherein it is checked if particular activation conditions are fulfilled, and in that the set of the steps (a) to (d) is implemented when these particular activation conditions are fulfilled.

7. The method according to claim 1, wherein the comparison value corresponds to the error signal.

8. The method according to claim 1, wherein an intermediate step is implemented between the steps (c) and (d), upon which the error signal is filtered to obtain said comparison value.

9. The method according to claim 8, wherein at the intermediate step, a Kalman filter is used, control parameters of which are optimized to improve the response and the stability of the filter.

10. The method according to claim 1, wherein, in the case of a detection of an uncontrolled movement at step (a), the actuator is automatically switched into a passive mode and an auxiliary actuator which was previously in a passive mode is automatically switched into an active mode, in which it has then as a function to adjust the position of the control surface.

11. The method according to claim 1, wherein, in the case of a detection of an uncontrolled movement at step (d), a detection piece of information is emitted.

12. A detection device for an uncontrolled movement of a control surface of an aircraft which is servo-controlled in position by a feedback loop, said feedback loop belonging to an electrical flying command system the aircraft and comprising:
   said control surface being mobile and the position of which with respect to the aircraft is adjusted by at least one actuator;
   said actuator that adjusts the position of the control surface as a function of at least one actuating order received as a feedback command;
   at least one sensor measuring the effective position of said control surface; and
   one calculator developing a control surface command order, that receives said measured effective position and deducts from it an actuating order that is transmitted to said actuator as a feedback command,
   said device comprising:
   first means to determine a theoretical feedback current representative of said feedback command emitted by said calculator;
   at least one auxiliary sensor being connected to said actuator and which is provided so as to measure a parameter representative of the feedback command from which an effective feedback current is determined;

second means to calculate the difference between said theoretical feedback current and said effective feedback current so as to create an error signal; and third means detect an uncontrolled movement of the control surface if a comparison value depending on said error signal is higher than a threshold value during at least one confirmation time.

13. The device according to claim 12, wherein said actuator adjusting the position of said control surface is a hydraulic actuator, and in that said auxiliary sensor is arranged at the level of a slide of a servo valve.

14. The device according to claim 12, wherein said actuator that adjusts the position of said control surface is a hydraulic actuator, and in that said auxiliary sensor is arranged at the level of an electrical engine of the latter.

15. An electrical flying command system of an aircraft, said system comprising:

at least one means generate a command order for a control surface for at least one control surface the aircraft; and at least one feedback loop in position of such control surface , comprising:

said control surface being mobile and the position of which with respect to the aircraft is adjusted by at least one actuator;

said actuator that adjusts the position of the control surface as a function of at least one actuating order received;

at least one sensor measuring the effective position of said control surface ; and one calculator developing a control surface command order, that receives said measured effective position and deducts from it an actuating order that is transmitted to said actuator, a detection device , which comprises:

first means to determine a theoretical feedback current representative of said feedback command emitted by said calculator;

at least one auxiliary sensor being connected to said actuator and which is provided so as to measure a parameter representative of the feedback command from which an effective feedback current is determined;

second means to calculate the difference between said theoretical feedback current and said effective feedback current so as to create an error signal; and third means to detect an uncontrolled movement of the control surface if a comparison value depending on said error signal is higher than a threshold value during at least one confirmation time.

* * * * *